Figure 1:
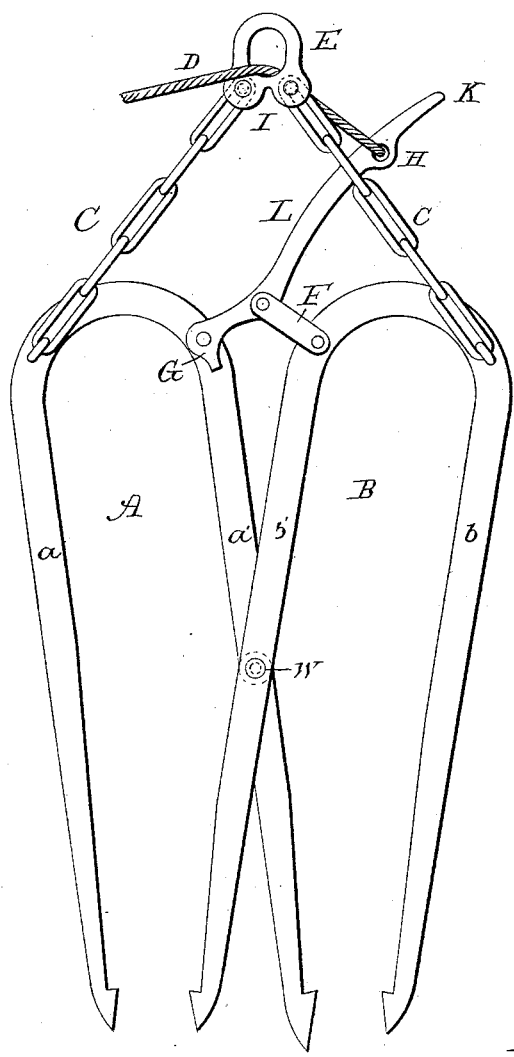

(No Model.)

W. LOUDEN.
HAY ELEVATING FORK.

No. 348,632. Patented Sept. 7, 1886.

Witnesses:
R. B. Louden
W. H. Camblin

Inventor
William Louden

UNITED STATES PATENT OFFICE.

WILLIAM LOUDEN, OF FAIRFIELD, IOWA.

HAY-ELEVATING FORK.

SPECIFICATION forming part of Letters Patent No. 348,632, dated September 7, 1886.

Application filed February 4, 1886. Serial No. 190,858. (No model.)

*To all whom it may concern:*

Be it known that I, WILLIAM LOUDEN, of Fairfield, in the county of Jefferson and State of Iowa, have invented certain new and useful Improvements in Hay-Elevating Forks; and I do hereby declare the following to be a full, clear, and exact description of the invention, such as will enable others skilled in the art to which it pertains to make and use it, reference being had to the accompanying drawings, which form part of this specification.

My invention relates to an improvement in hay-elevating forks; and it consists in, first, the combination of two or more penetrating bars or tines pivoted together so as to have a shear-blade movement on each other, and a lever for operating them, the lever being pivoted to one of the bars or tines, and having an elbow or angular part formed on its pivoted end, so as to strike against and to form a stop for the other bar or tine; second, the combination of two or more penetrating bars or tines pivoted together so as to have a shear-blade movement on each other and a lever for operating them, the lever being pivoted to one of the bars or tines, and having a projection formed at a suitable point on its free end, so as to strike against and rest upon the opposite bar or tine; third, the combination of two or more pivoted bars or tines, a lever for operating them, and an eye or ring connected to the tines by chains or other flexible fastenings, and through which a cord is passed to operate the lever, the free end of the lever being extended sufficiently beyond the attachment of the cord to prevent it from being drawn through the eye or ring by a pull on the cord; fourth, the combination of two or more pivoted bars or tines and two or more chains connected to them and to an eye or hook, so as to sustain the fork when elevated, and to guide the tripping-cord from the tripping device, the lower part of the eye being forked to receive the chains; fifth, the combination of two or more penetrating bars or tines pivoted together so as to have a shear-blade movement on each other, a lever for operating them, and a washer placed upon the pivoting bolt or rivet to hold the central parts of the bars or tines apart; sixth, in a hay-elevating fork having two or more parts pivoted together for grasping and holding the hay, the combination of an operating-lever provided with projecting stops formed upon it at or near opposite ends, so as to stop the movement of the lever in both directions; seventh, in a hay-elevating fork having two or more parts pivoted together for grasping and holding the hay, the combination of an operating-lever having projecting stops formed thereon to arrest the movement of the lever, its free end being extended beyond the stop on that part to provide a suitable hand-hold for operating it by hand; eighth, in a hay-elevating fork having two or more parts pivoted together for grasping and holding the hay, the combination and arrangement of the foregoing parts, so as to unite the different combinations herein claimed in one and the same fork.

Figure 2:
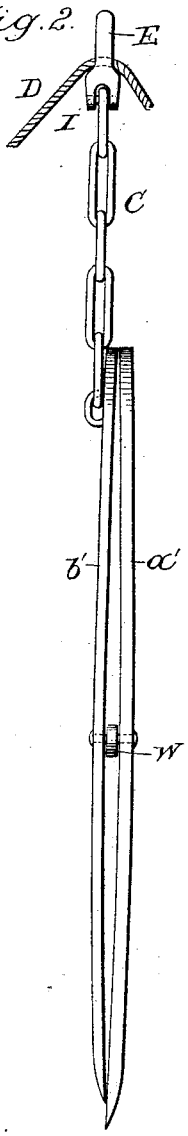
Figure 3:
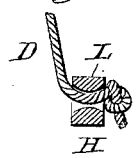
Figure 4:
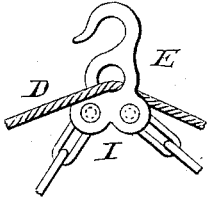

Figure 1 is a side view showing the fork in a half-open position. Fig. 2 is an edge view, the lever and outside tines being removed. Figs. 3 and 4 are detail views.

As shown in Fig. 1, the fork is composed of two parts, A and B, each part having two penetrating bars or tines, $a\ a'$ and $b\ b'$. The parts A and B are pivoted together near the middle of the bars or tines $a'\ b'$, which will be called the "central" tines, and $a\ b$ the "outside" tines. The lever L is pivoted to the part A, and is connected by means of a toggle-joint, F, to the part B. By raising up the free end of the lever L the tines will all be drawn approximately parallel to each other, the central tines, $a'\ b'$, being drawn together, so as to form but one penetrating point, as shown in Fig. 2. In this position the fork is ready for insertion in the hay, and when inserted the downward movement of the lever L will cause the points of the central tines to separate from each other, and to approach and be approached by the outside tines, and to firmly grasp the hay between them. To the upper ends of the parts A and B chains C C are attached, and these chains are connected to an eye, E. The fork is attached to the elevator by means of the eye E, and a cord, D, is passed through this eye and connected to the lever L, so as to raise it and discharge the hay.

In order to prevent the parts A and B from being drawn together at their upper ends so much that the tines will pass beyond their parallel position and the points of the central tines will pass beyond each other so they cannot be inserted in the hay, I form an elbow or angular part, G, on the pivoted end of the lever L, so as to strike the part B and prevent it from coming too close. Otherwise a special stop would have to be formed on the part A or B, or both, which would involve additional expense; or the lever L, not having this projection, would have to be pivoted so nearly in the center to form a suitable stop that it would not be in a proper position to operate the parts A and B freely. By this means the cost of the stop is reduced to the minimum, and the lever L can be pivoted so as to work freely in operating the parts A and B. The eye in the lever L, through which the cord D is attached, necessarily forms a projection, H, on the lever. This projection H, I have utilized to form a stop to stop the downward movement of the lever by making it broad and forked, as shown in Fig. 3, so that it will readily catch and hold on the upper end of the part B, and thus prevent the toggle-joint F from passing too far past its center. It also forms a substantial brace to prevent the end K from being bent by striking against obstructions.

The eye E, to which the chains C C are connected, has its lower end, I, made forked to receive the links of the chains, which are secured in their place by bolts or rivets, as shown in Figs. 1 and 2. By this means the links of the chains, instead of encircling the ring, which forms the eye E, to interfere with the passage of the cord D, are placed where they are out of the way, and the eye E is left perfectly clear for the passage of the cord D. Besides, making the lower part of the eye forked to receive the links of the chains makes the part of the eye over which the cord passes larger than it would otherwise be, thus affording a surface with a larger curve for the cord to pass over, thereby reducing the wear on the cord. The end K of the lever L being extended beyond the stop H and the attachment of the cord D, forms a convenient handhold for operating the lever by hand, and also prevents the end of the lever from being drawn through the eye E by a pull on the cord D. The central tines, a' b', are made slightly curved, so that when the ends will be together the central parts will be somewhat apart. In the aperture thus formed I place the washer W, and pass the connecting bolt or rivet through it. By this means the tines can be riveted or bolted up tightly and still work freely, and not become gummed up with paint or grease, and the points of the tines will still be close together, so as to enter the hay without it passing in between them.

It is not essential that the parts A and B be composed of the four penetrating tines, as shown. If desired, the outside ones, a b, can be cut off just below the attachment of the chains C C and be dispensed with, as shown in Fig. 2. In this case the shoulders on the points of the tines will have to be depended upon to hold the hay, while in the former case they are not depended upon entirely, and may even be dispensed with if the grip of the tines be made strong and secure; and, further, if preferred, the eye E may have a hook formed on it, as shown in Fig. 4, without departing from the spirit of my invention.

Having thus described my invention, I claim—

1. The combination of two or more penetrating bars or tines pivoted together so as to have a shear-blade movement on each other, and a lever for operating them, the lever being pivoted to one of the bars or tines, and having an elbow or angular part formed on its pivoted end, so as to strike against and to form a stop for the other, substantially as shown and described.

2. The combination of two or more penetrating bars or tines pivoted together so as to have a shear-blade movement on each other, and a lever for operating them, the lever being pivoted to one of the bars or tines, and having a projection formed at a suitable point on its free end, so as to strike against and rest upon the opposite bar or tine, substantially as described.

3. The combination of two or more pivoted bars or tines, a lever for operating them, and an eye or ring connected to the tines by chains or other flexible fastenings, and through which a cord is passed to operate the lever, the free end of the lever being extended sufficiently beyond the attachment of the cord to prevent it from being drawn through the eye or ring by a pull on the cord, substantially as set forth.

4. The combination of two or more pivoted bars or tines and two or more chains connected to them and to an eye or hook having an eye, so as to sustain the fork when elevated and to guide the tripping-cord from the tripping device, the lower part of the eye being forked to receive the chains, substantially as and for the purpose set forth.

5. The combination of two or more penetrating bars or tines pivoted together so as to have a shear-blade movement on each other, a lever for operating them, and a washer placed between them, substantially as specified.

6. In a hay-elevating fork having two or more parts pivoted together for grasping and holding the hay, the combination of the lever L, being provided with the stops G and H, substantially as and for the purpose set forth.

7. In a hay-elevating fork having two or more parts pivoted together for grasping and holding the hay, the combination of the lever L, having the stops G and H, and the extended end K, substantially as specified.

8. The combination of the parts A and B, the washer W, the lever L, the chains C C, and the eye E, substantially as shown and described.

In testimony whereof I affix my signature in the presence of two witnesses.

WILLIAM LOUDEN.

Witnesses:
F. S. FREEMAN,
P. W. SCOTT.